United States Patent [19]
Kyhl et al.

[11] Patent Number: 5,374,969
[45] Date of Patent: Dec. 20, 1994

[54] PORTABLE OVERHEAD PROJECTOR

[75] Inventors: David H. Kyhl, Leonia; Henry C. Kyhl, Englewood, both of N.J.

[73] Assignee: Buhl Industries, Inc., Fairlawn, N.J.

[21] Appl. No.: 154,742

[22] Filed: Nov. 17, 1993

[51] Int. Cl.⁵ .............................................. G03B 21/30
[52] U.S. Cl. .............................. 353/119; 353/DIG. 3
[58] Field of Search .......... 353/119, DIG. 3, DIG. 4, 353/63, 65, 66, DIG. 6

[56] References Cited

U.S. PATENT DOCUMENTS

| | | | |
|---|---|---|---|
| 3,126,786 | 3/1984 | Appeldorn | 353/DIG. 6 |
| 3,167,998 | 2/1965 | Appledorn | 353/DIG. 3 |
| 3,366,005 | 1/1968 | Benedict | 353/DIG. 3 |
| 4,089,599 | 5/1978 | Kuboshima | 353/DIG. 3 |
| 4,449,800 | 5/1984 | DeLougis et al. | 353/DIG. 3 |
| 4,968,134 | 11/1990 | Shimizu et al. | 353/DIG. 3 |

FOREIGN PATENT DOCUMENTS 3519506 12/1986 Germany .

*Primary Examiner*—William A. Cuchlinski, Jr.
*Assistant Examiner*—William C. Dowling
*Attorney, Agent, or Firm*—Darby & Darby

[57] ABSTRACT

A portable overhead projector comprising a rigid housing, a collapsible expansion housing, a fold mirror, a fresnel lens, a light source and a projecting head assembly. In the portable configuration of the projector, all of the operational elements of the projector are collapsed into the confines of the rigid housing. The expansion housing is a box-like assembly having two fixed and two hinged sidewalls. The first and second sidewalls are integrally formed with a bottom wall of the expansion housing. The bottom edges of the third and fourth sidewalls are attached via hinges to opposite marginal edges of the bottom wall. The top edges of the third and fourth walls are attached to the underside of the rigid housing by two hinges. The fold mirror is mounted via a hinge to the inner surface of the bottom wall. The projection head assembly which includes a projecting lens and a projection mirror is attached to the rigid housing by a post, a rack and pinion gear mechanism and a mounting arm. The post is rotatable between a stowed position in which the entire projection head assembly is received inside the rigid housing, and an operational position in which the post is in a generally upward and perpendicular direction from the fresnel lens.

14 Claims, 5 Drawing Sheets

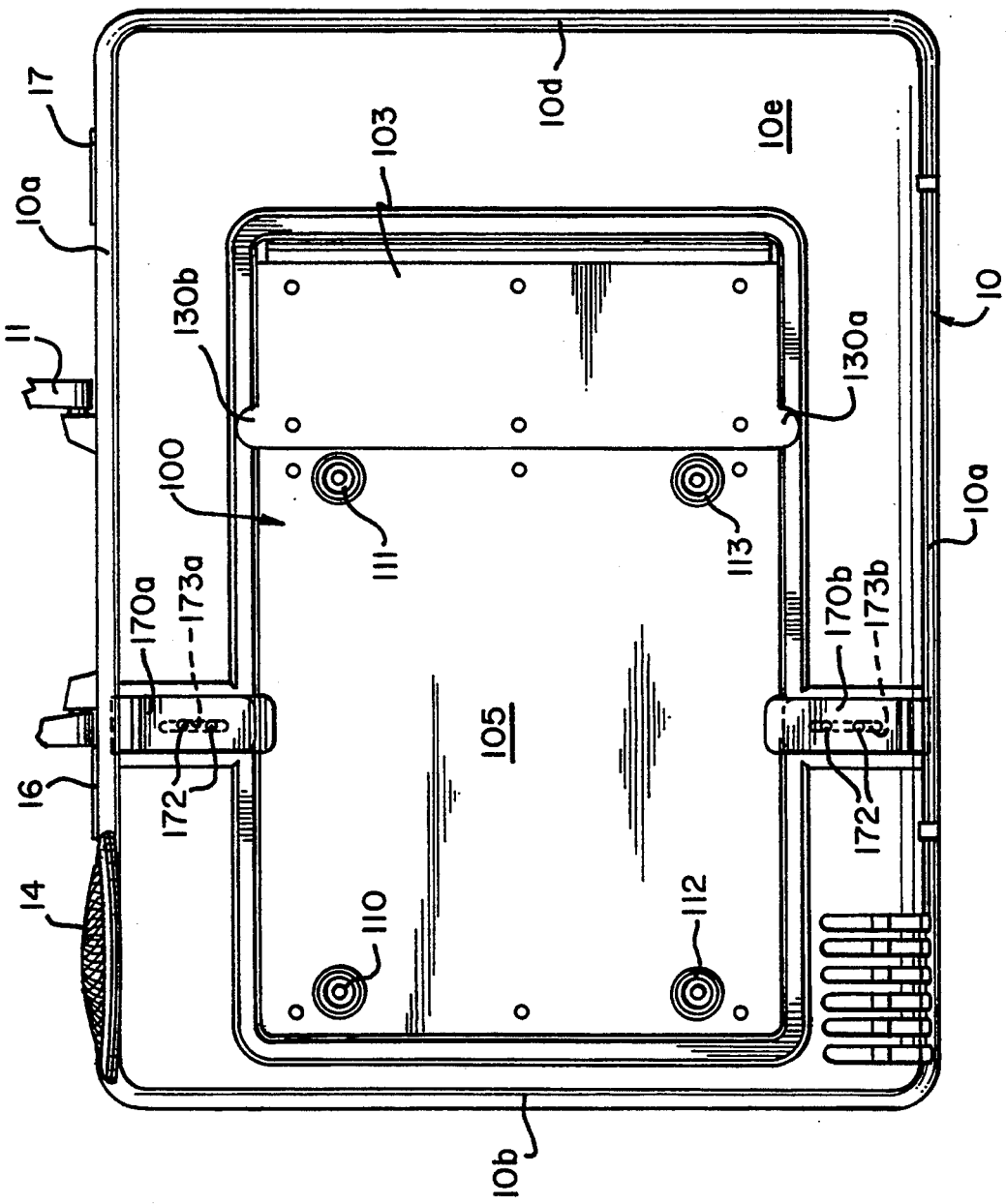

PORTABLE OVERHEAD PROJECTOR

FIELD OF THE INVENTION

The present invention relates generally to portable overhead projectors and, in particular, to an overhead projector which makes use of folded optics and can be collapsed into a compact case for easy carrying and handling.

BACKGROUND OF THE INVENTION

Overhead projectors are used to project and enlarge an image contained on a transparent sheet onto a remote screen for easy viewing. In general, these projectors have a light source which projects light towards a fresnel lens which supports the transparency. After passing through the fresnel lens and the transparency, the light containing the image is focused and projected by a projection head assembly mounted some distance above the top surface of the fresnel lens. The head assembly includes a lens system and a mirror for changing the direction of the path of the light and for projecting the image onto the remote screen.

In traditional overhead projectors, the light source is located a predetermined distance directly beneath the fresnel lens. This design is disadvantageous in that the required spacing between the light source and the fresnel lens dictates that the projector housing be relatively large. Such constructions are further disadvantageous in that cooling becomes significant when the light source is mounted in the projector body directly beneath the fresnel lens and transparency. One solution to the problems associated with traditional overhead projectors was the introduction of folded optics into the optical system. In a folded optics system, the light source is mounted outside of the optical field of the fresnel lens. The light is directed toward a mirror which is mounted beneath the fresnel lens. The mirror redirects the light towards the fresnel lens carrying the transparency. The mirror is mounted at an angle relative to the fresnel lens and the light source such that it appears as if the light source is mounted directly beneath the fresnel lens as in a traditional projector. The term "folded" is used to describe this type of optics because the light is "folded" when it strikes the mirror in order to direct the light toward the fresnel lens. An overhead projector incorporating folded optics can be constructed with a reduced height and significantly simplified cooling mechanisms relative to a projector without such folded optics. However, even folded optics projectors have an inherent height limitation. That is, sufficient spacing is required to position the mirror properly so it will reflect the light from the light source, through the lens to the head assembly. Thus, although folded optics systems do present an improvement, such machines still prove to be bulky and unwieldy to easily handle and manipulate.

SUMMARY OF THE INVENTION

It is the main object of the present invention to overcome the disadvantages of traditional, direct optics, overhead projectors and to provide a folded optics projector which is portable, compact, easily carried and which is easily assembled and collapsed.

These and other objects of the present invention are carried out in accordance with the present invention by a portable overhead projector which has a rigid housing, a collapsible expansion housing, a fold mirror, a light source and a optical projection system. The rigid housing contains means for mounting the light source and optical projection system. In the collapsed state of the projector, all of the operational elements of the projector including the expansion housing and the fold mirror are collapsed into the confines of the rigid housing. In this manner the projector becomes compact and portable, resembling a briefcase.

The expansion housing is a box-like assembly which is hingedly attached to the underside of the rigid housing. In its extended (or operational) position, the expansion housing extends outward of the rigid housing. The fold mirror is received in the expansion housing and has two positions. In its collapsed state, the fold mirror is retracted into the rigid housing along with the expansion housing. In its operational position, the fold mirror is positioned in the path of light from the light source in order to reflect the light to the optical projection system and ultimately to a remote viewing screen.

BRIEF DESCRIPTION OF THE DRAWINGS

The features and advantages of the present invention will be more fully understood from a reading of the following detailed description with reference being made to the drawings in which:

FIG. 7 is a bottom view of the projection of the present invention in the collapsed state.

DETAILED DESCRIPTION OF THE PREFERRED EMBODIMENT

Figure 1:
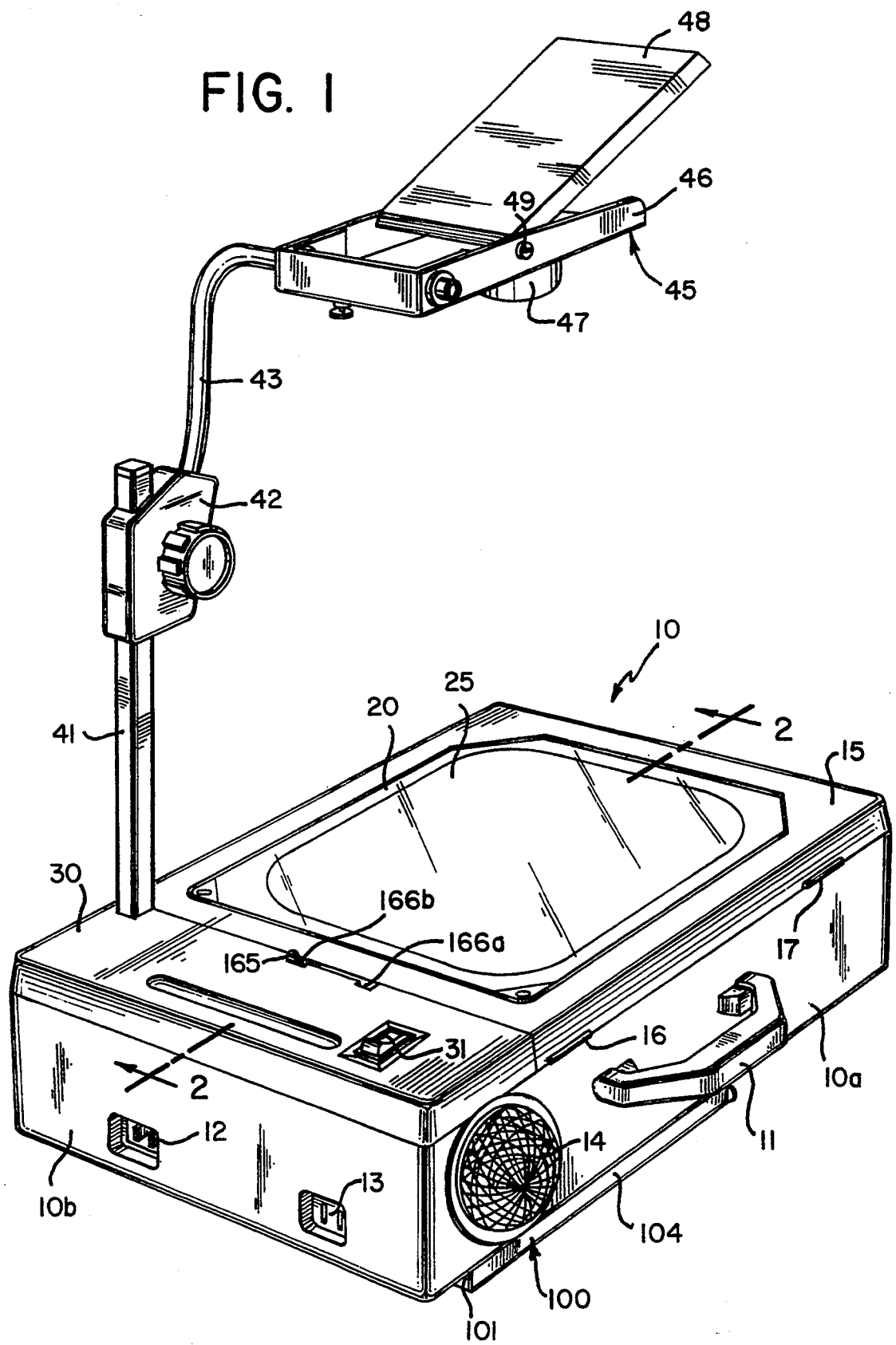
FIG. 1 is a perspective view of the portable overhead projector according to the present invention, in its operational state.
Figure 2:
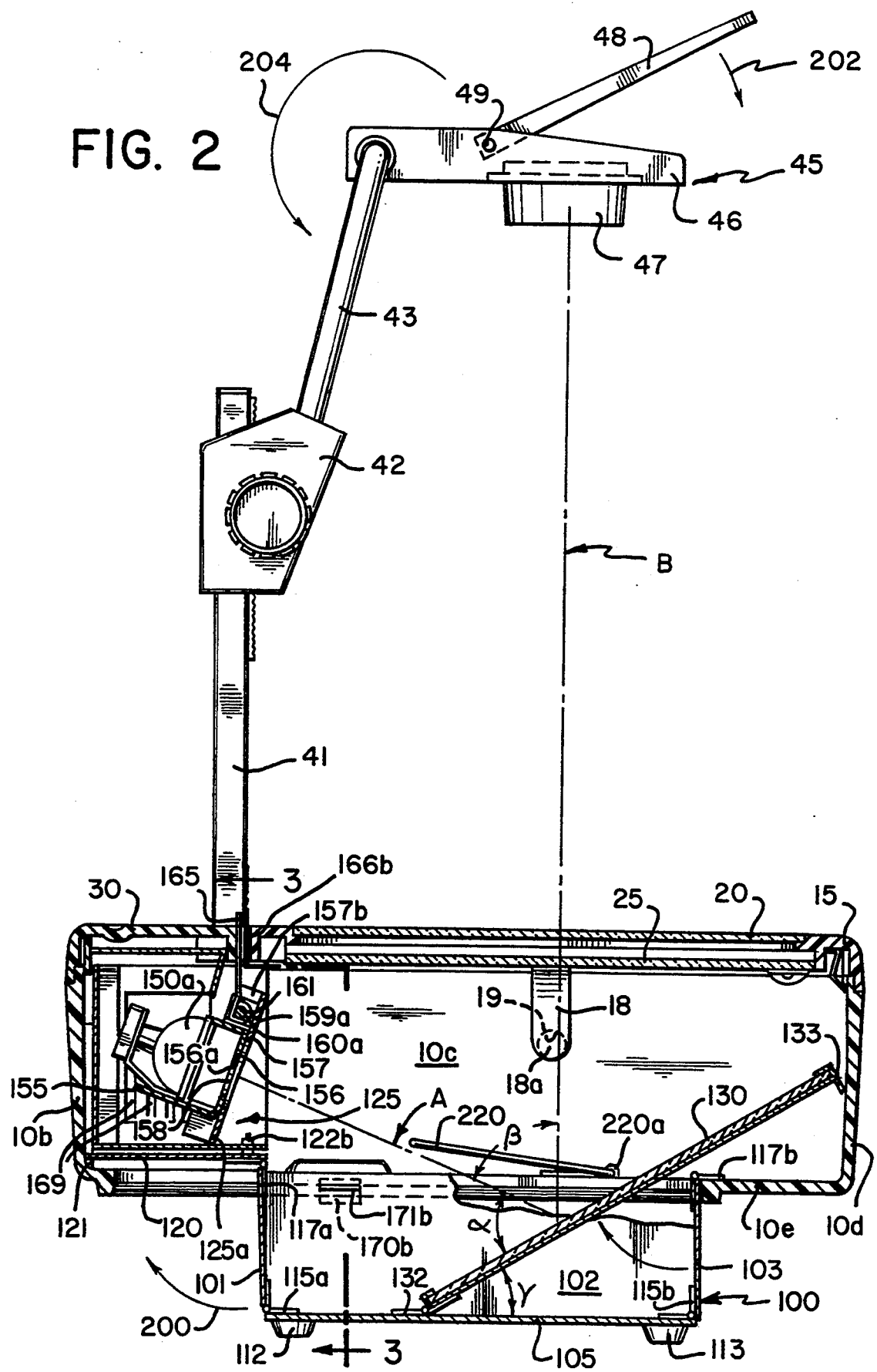
FIG. 2 is a vertical cross-sectional view of the projector of FIG. 1.
Figure 3:
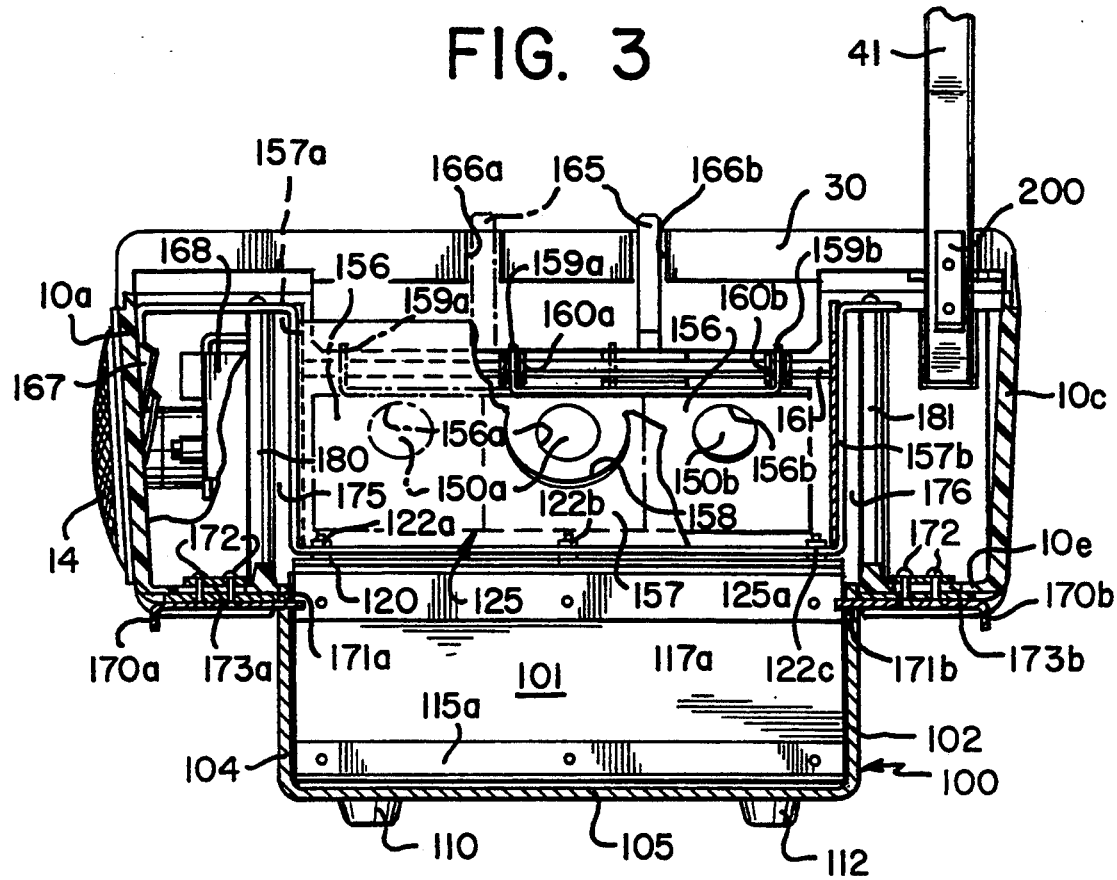
FIG. 3 is a cross sectional view of the assembled projector of FIG. 2 taken along line 3—3 of FIG. 2.

FIGS. 1—3 depict the overhead projector constructed according to the present invention when the projector is in its operational state. As seen in these Figures, the projector includes a rigid housing 10 having four sidewalls 10a–10d, and a bottom wall 10e. A mounting frame 15 is attached along one of its marginal edges to rigid housing 10 by hinges 16 and 17. When mounting frame 15 is closed, the opposite marginal edge of mounting frame 15 is secured to rigid frame 10 by lock tab 18 (see FIG. 2). Lock tab 18 is a metal appendage depending from mounting frame 15. A semicircular button 18a is formed near the bottom of lock tab 18. As the mounting frame 15 moved to the closed position, button 18a will be forced into an aperture 19 in rigid housing sidewall 10c. Lock tab 18 is positioned on mounting frame 15 and is formed such that it has a spring action which requires an intentional force to unseat button 18a from aperture 19. Mounting frame 15 is used for supporting a glass stage 20 and a fresnel lens 25. The rigid housing also includes a handle 11, a power entry receptacle 12 for connection with a power line cord (not shown), an auxiliary AC (or courtesy) outlet 13 for supplying power to an accessory device such as an LED panel (not shown), and a fan/vent cover 14.

Also mounted on top of the rigid housing 10 is a lamp housing compartment cover 30. A power switch 31 is incorporated into the lamp housing cover 30. The top surfaces of the lamp housing cover 30, glass stage 20 and mounting frame 15 form an essentially planar surface.

In the projector's configuration shown in FIGS. 1–3, a projection head assembly 45 is mounted, via post 41, above glass stage 20 and in alignment with fresnel lens 25. The projection head assembly 45 is attached to post 41 by a rack and pinion gear mechanism 42 and a mounting arm 43. The assembly 45 is commonly referred to as a duck bill type. The separate components of the projection head assembly 45 comprise a projecting head frame 46, a projecting lens 47, and a projection mirror 48. Projection mirror 48 is pivotally attached to projecting head frame 46 by pivot pins 49. The pin 49 can either be constructed from a single pivot pin or a rod which traverses the entire width of the projecting head frame 46, or it can be formed by a pair of nut and bolt assemblies, one nut and bolt pair for each side of the attachment of projection mirror 48 to projecting head frame 46. Similarly, projection head frame 46 is pivotally attached to mounting arm 43. The pivoting operation of the projecting mirror 48 and projecting head frame 46 will be discussed in greater detail below with respect to the collapsible operation of the projector of the present invention.

In its operational or extended configuration shown in FIGS. 1-3, the projector is supported by extension housing 100. Extension housing 100 has four sidewalls, 101, 102, 103, and 104 and a bottom wall 105. As seen most clearly in FIG. 3, sidewalls 102 and 104 are integrally formed with bottom wall 105 forming a U-shaped structure. FIG. 2 illustrates the hinged mounting of sidewalls 101 and 103. The lower edges of sidewalls 101 and 103 are attached to bottom wall 105 via hinges 115a and 115b respectively. The opposing upper edges of extension housing sidewalls 101 and 103 are respectively attached to rigid housing 10 via hinges 117a and 117b. Hinge 117b is connected directly to bottom wall 10e of the rigid housing 10. Hinge 117a connects expansion housing sidewall 101 to a support member 120. Support member 120 is supported by a ledge 121 formed in sidewall 10b of rigid housing 10. Support member 120 is further attached via a nut and bolt assembly 122 to the bottom wall 125a of a lamp compartment 125. Hinge 117a is connected to support member 120 since bottom wall 10e of rigid housing 10 is cut away in this area to accommodate the collapsed expansion housing 100 (see FIGS. 6 and 7).

FIG. 2 also shows some of the essential optical components contained in rigid housing 10, including lamp 150a and fold mirror 130. Fold (or chamber) mirror 130 is shown in its operational position. Fold mirror 130 is attached to bottom wall 105 of expansion housing 100 via hinge 132. In this operational position, flange 133, on the end of fold mirror 130, rests upon sidewall 10d of rigid housing 10. The exact attachment point of hinge 132 to bottom wall 105 is determined by the angle of incidence $\alpha$ of the light from lamp 150a required to produce a light beam perpendicular to fresnel lens 25. The light travels from lamp 150a, along the path indicated by line A, is reflected or folded after striking fold mirror 130, travels substantially perpendicularly through fresnel lens 25 along the path indicated by line B, to projecting lens 47, strikes projection mirror 48 and is reflected onto a remote viewing screen (not shown).

The interior angle $\beta$ between the lines A and B satisfies the relationship $2\alpha + \beta = 180°$. The angle $\gamma$ formed between fold mirror 130 and bottom wall 105 is given by $\gamma = 90° - \alpha$. Solving these two equations simultaneously, it is determined that $\gamma = \frac{1}{2}\beta$. Therefore, for a given angle $\beta$, the positioning of hinge 132 must be adjusted to create the proper angle $\gamma$ where $\gamma = \frac{1}{2}\beta$. If the angle of the light coming from lamp 150a is changed, the attachment point of fold mirror 130 must be adjusted accordingly. Preferably, the angle of the light coming from lamp 150a is fixed at the time of manufacture and the attachment point of hinge 132 and fold mirror 130 is made permanent.

As seen in FIG. 2, lamp 150a is mounted on lamp holder 155. Although only a single lamp 150a is shown in FIG. 2, two separate lamps 150a, 150b (FIG. 3) are mounted on lamp holder 155 for backup operation. If one of the lamps 150a or 150b fails, the user of the projector is able to select the other lamp for operation. In order to enable lamp selection, lamp holder 155 is rotatably attached via flanges 159a, 159b and bushings 160a, 160b, to rod 161. Rod 161 is fixedly attached to the two sidewalls of lamp compartment 125. An angled front plate 157 is also fixedly attached to the two sidewalls of lamp compartment 125 at flanges 157a and 157b of front plate 157. As the lamp holder 155 is rotated about rod 161, the front face 156 of lamp holder 155 will abut front plate 157 which determines the operational position of lamps 150a and 150b. The angle of plate 157 with respect to the horizontal plane of the projector, will therefore determine the angles $\alpha$, $\beta$ and $\gamma$ via the light path A.

In FIG. 3, lamp holder 155 is shown in the operational position where lamp 150a is the operative lamp. As stated previously, flanges 159a, 159b and bushings 160a, 160b permit lateral movement of lamp holder 155 on rod 161. The alternative operational position of lamp holder 155 is shown in phantom in FIG. 3. In this position, lamp 150b is the operative lamp. Front face 156 of holder 155 has two apertures 156a and 156b for the passage of light from lamps 150a and 150b respectively. Angled plate 157 has only a single aperture 158 therethrough in order to pass light from either lamp 150a or 150b.

In order to allow the user of the projector to select either lamp 150a or 150b for operation, a lamp selection control lever 165 is fixedly attached to the top of lamp holder 155, as shown in FIGS. 2 and 3. Two notches, 166a and 166b are formed in lamp housing compartment cover 30 for the receipt of control lever 165. These two notches 166a, 166b correspond to the operational positions of lamps 150a and 150b respectively. When control lever 165 is positioned in notch 166a, the projector will operate lamp 150a as depicted in FIG. 3. When control lever 165 is positioned in notch 166b, lamp 150b will be aligned with opening 158, as indicated in phantom in FIG. 3. In order to switch between lamps, a user pushes the control lever forward (towards mounting frame 15) out of notch 166a or 166b. (The lamp holder rotates about the bushings 160a, 160b.) At this point, control lever 165 is moved laterally to the other notch 166a or 166b. As the control lever is moved laterally, lamp holder 155 will also move laterally on rod 161 via flanges 159a, 159b and bushings 160a, 160b. Solely by the force of gravity and the mass of lamp holder 155, control lever 165 will seat in either the notch 166a or 166b.

Contrary to the lamp switching mechanisms of the prior art, the present invention does not use any springs to change lamps. When the lampholder 155 is moved laterally from one operational position to the other, it trips a mechanical switch (not shown) which will supply power to the lamp 150a or 150b, depending upon which lamp is moved to the operational position.

As seen in FIG. 3, a fan 167 and fan motor 168 are used to cool lamps 150a, 150b. Because of the folded optics design, all of the heat generated by lamps 150a, 150b is confined to lamp compartment 125, as opposed to being generated beneath the fresnel lens in the main projector compartment as in the prior art projectors. Fan 167 is used to draw air through vents 169 (see FIG. 2) in rigid housing sidewall 10c. The air passes through lamp compartment 125, thus cooling lamps 150a, 150b, and exits through fan/vent cover 14.

FIGS. 2 and 3 illustrate the mechanism for securing expansion housing 100 in its operational or extended position. Tabs 170a and 170b are slidably attached to bottom wall 10e of rigid housing 10 for selective engagement with expansion housing 100. Once expansion housing 100 has been extended to its fully operational position, as shown in these FIGS., tabs 170a and 170b are slid into slots 171a and 171b in fixed sidewalls 104 and 102 respectively. Slots 171a and 171b are approximately the same size in cross-section as tabs 170a and 170b. Once tabs 170a, 170b have been engaged in slots 171a, 171b, expansion housing 100 is secured and can not rotate about hinges 115a, 115b, 117a and 117b. Tabs 170a, 170b are slidably fixed to bottom wall 10e of rigid housing 10 by a suitable attachment means, such as a nut and bolt assembly 172 as is shown in FIG. 3. The bolt of assembly 172 extends through bottom wall 10e and through respective elongated slots 173a and 173b in tabs 170a, 170b respectively (see FIG. 7). Nut and bolt assembly 172 is loose enough to permit tabs 170a, 170b to slide laterally, but are tight enough to secure tabs 170a, 170b to the bottom wall 10e.

Figure 5:
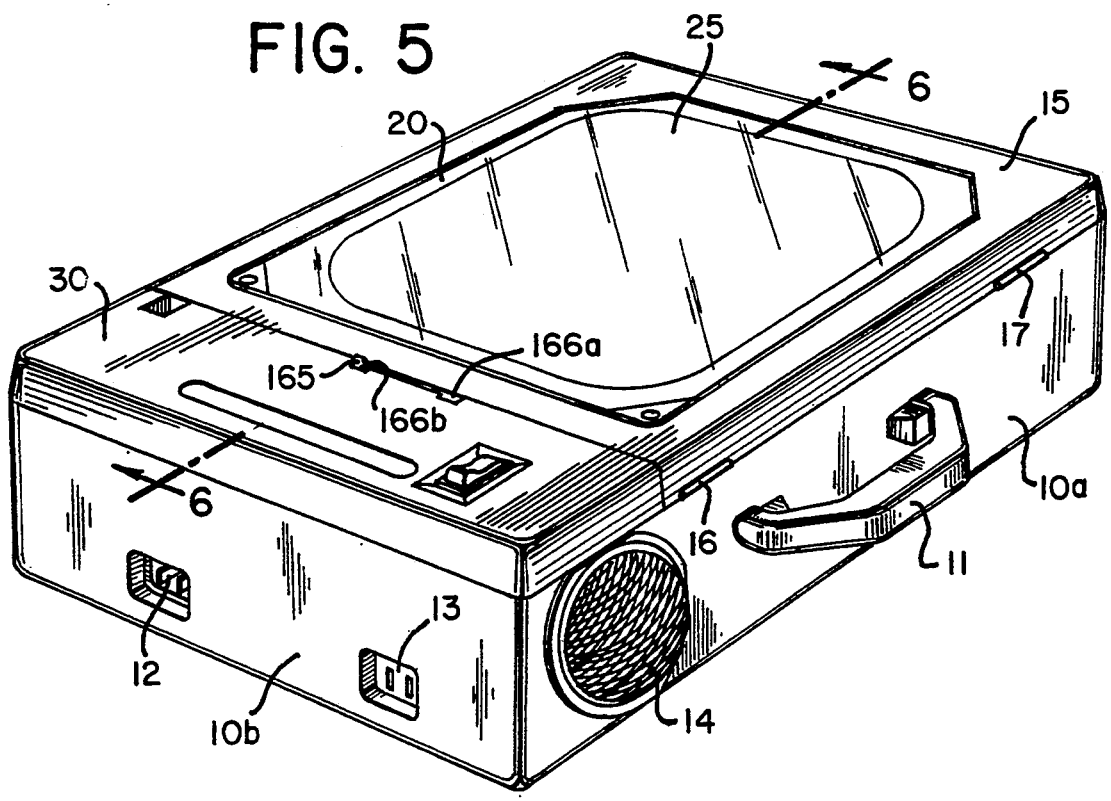
FIG. 5 is a perspective view of the invention in the collapsed state.

In order to collapse the portable projector of the present invention, it is preferable to first move expansion housing 100 back to the retracted position (i.e., into the confines of rigid housing 10). Expansion housing 100 is collapsed by withdrawing tabs 170a, 170b from slots 171a, 171b respectively. With tabs 170a, 170b disengaged, expansion housing 100 is free to pivot on hinges 115a, 115b, 117a and 117b. As seen in FIG. 2, the bottom edges of sidewalls 101 and 103 will pivot on hinges 115a and 115b respectively, in a generally rearward and upward direction, as indicated by arrowhead 200. Simultaneously, the upper edges of sidewalls 101 and 103 will pivot about hinges 117a and 117b respectively. The pivoting motion about hinges 115a–117b will continue until expansion housing 100 has been fully collapsed to its retracted (or stowed) position as shown in FIG. 5.

Figure 6:
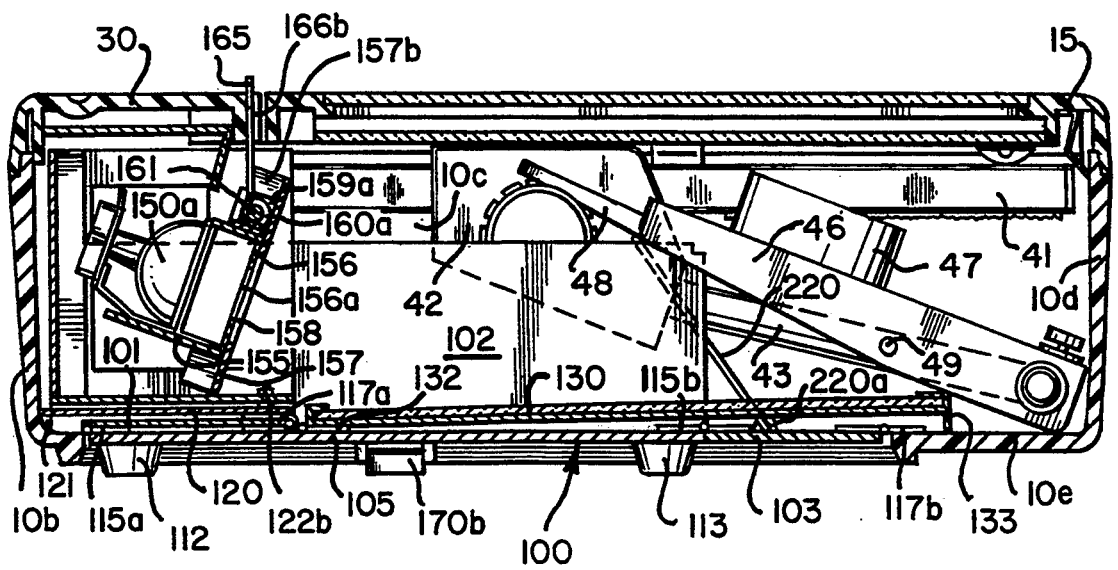
FIG. 6 is a vertical cross-sectional view of the projector showing the elements in the collapsed state.

In the fully collapsed state, sidewall 103 and bottom wall 105 are substantially coplanar (FIG. 6) while sidewall 101 is folded back atop bottom wall 105. Fold mirror 130 resides substantially horizontal above bottom wall 105 and sidewall 103, and its end flange 133 rests on bottom wall 10e of rigid housing 10. That is, as wall 105 moves to the retracted position, the mirror pivot 132 similarly moves toward the left as taken in FIG. 6, thereby moving flange 133 away from wall 10d. Expansion housing sidewalls 102 and 104, which are rigidly mounted to bottom wall 105, slide upward into rigid housing 10. As seen in FIG. 3, the rearward portions of sidewalls 104 and 102 slide into spaces 175 and 176 between the sidewalls of lamp compartment 125 and support members 180 and 181 respectively. The remaining portions of sidewalls 102 and 104 extend into in the main compartment of rigid housing 10 as shown in FIG. 6. Once expansion housing 100 has been fully collapsed to the configuration shown in FIG. 6, tabs 170a and 170b are once again slid inwardly, this time engaging the bottom surface of bottom wall 105 of expansion housing 100 (see FIG. 7). Once tabs 170a, 170b are so engaged, expansion housing 100 is prevented from pivoting out of its stowed configuration. As seen in FIG. 6, once the projector has been fully collapsed, the projector will still rest on feet 110–113 of expansion housing 100.

To complete collapsing the projector, post 41 and head assembly 45 must be stowed. The first step in this operation is to stow the projection head assembly 45. Projection mirror 48 is pivoted clockwise, towards projecting head frame 46, in the direction of arrowhead 202 (shown in FIG. 2). Next, the entire projecting head frame 46 is pivoted counterclockwise, in the direction of arrowhead 204, about mounting arm 43 until it is substantially coplanar to the vertical portion of mounting arm 43. A stop in projecting head frame 46 (not shown) will prevent further rotation of projecting head frame 46 in the counter-clockwise direction. A similar stop (not shown) will prevent the projecting head from rotating in a clockwise direction past its operational position shown in FIGS. 1 and 2. With the projection head assembly 45 thus rotated, rack and pinion gear mechanism 42 is used to lower projecting head assembly 45 on post 41. Prior to the lowering of projecting head assembly 45, mounting frame 15 is opened (pivoted on hinges 16 and 17) to enable access to the interior of rigid housing 10.

Figure 4:
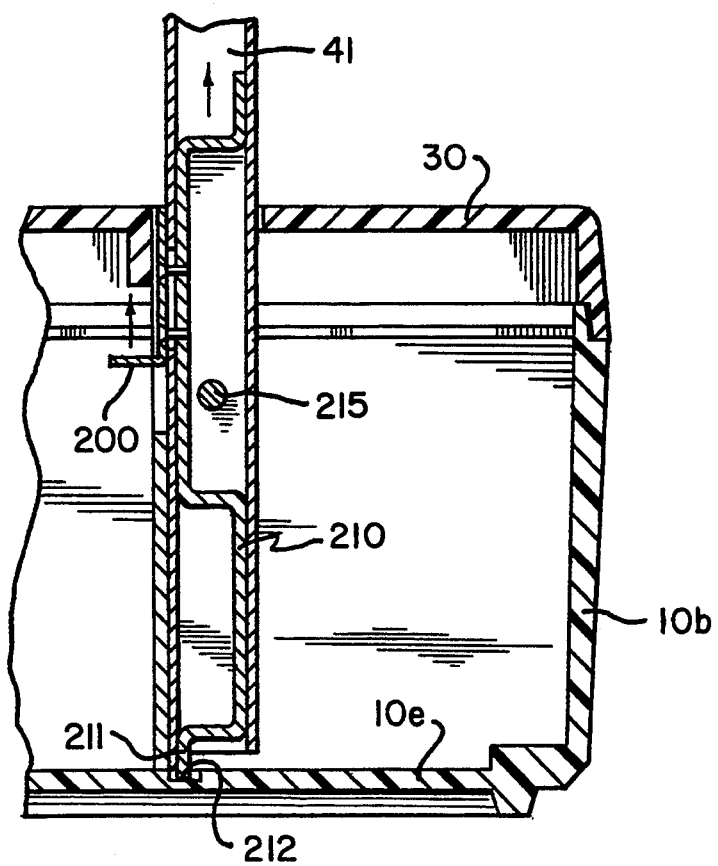
FIG. 4 is a detail cross sectional view of the post locking mechanism.

In order to stow post 41 and projecting head assembly 45 within rigid housing 10, post 41 is pivoted to a substantially horizontal position, as shown in FIG. 6. As shown in FIG. 4, post 41 is pivotally attached to rigid housing 10 via pivot pin 215. Although not specifically shown in this Figure, the attachment of pivot pin 215 to rigid housing 10 can be accomplished in any conventional manner. A latch 200 and a slide lock 210 are used to lock the post 41 in its operational position. In this operational position, a lower portion 211 of slide lock 210 is engaged a recess 212 in bottom wall 10e of rigid housing 10. Slide lock 210 is preferably constructed of an angled piece of flat metal stock. As long as portion 211 of slide lock 210 is engaged in recess 212, post 41 is prevented from pivoting away from its vertical operational position. In order to stow post 41 and projecting head assembly 45, latch 200 is raised. Thus, portion 211 of slide lock 210 will move outwardly of recess 212. Once portion 211 has been fully disengaged, post 41 is able to pivot about pin 215.

As post 41 is pivoted towards its final, horizontal, stowed position within rigid housing 10, head projecting head assembly 45 engages safety bar or bail 220 (FIG. 6). Safety bar 220 is automatically engaged by fixed sidewalls 102 and 104 of the expansion housing 100 as these walls enter the rigid housing during collapsing of the expansion housing 100 thereby automatically pivoting bar 220 clockwise about pivot 220a. The purpose of safety bar 220 is to prevent the head assembly 45 from rotating counterclockwise as taken in FIG. 6, and contacting (and possibly damaging) fold mirror 130. Once post 41 and projecting head assembly 45 have been stowed within rigid housing 10, mounting frame 15 is once again closed and latched as shown in FIG. 4.

In order to move the projector from its collapsed or retracted state (FIGS. 5-7) to its extended or operational state (FIGS. 1-3), the reverse of the operation described above is performed. Specifically, mounting frame 15 is opened and post 41 and projection head projecting head assembly 45 are raised out of the confines of rigid housing 10. As post 41 pivots on pivot pin 215, slide lock 210 will begin to contact the bottom surface of bottom wall 10e of rigid housing 10. When post 41 reaches its nearly vertical position. Portion 211 of slide lock 210 will drop, by the force of gravity, into recess 212 in bottom wall 10e. At this point, post 41 will be locked in its vertical position, and mounting frame 15 can be re-closed. Rack and pinion gear mechanism 42 is used to raise mounting arm 43 and head assembly 45 above glass stage 25, it being understood that the mechanism 42 is also used to focus the picture on the screen. Projection head assembly 45 is rotated in a clockwise direction, opposite the direction of arrowhead 204, to its operational position. Similarly, projection mirror 48 is rotated in a counter-clockwise direction, opposite arrowhead 202, to its operational position.

Expansion housing 100 is released from its stowed position by retracting tabs 170a and 170b, thus disengaging tabs 170a, 170b from bottom wall 105 of expansion housing 100. The retracted positions of tabs 170a and 170b are shown in phantom in FIG. 7. Once released, expansion housing 100 will pivot downward and forward from its retracted position, pivoting on hinges 115a-117b. As seen in FIG. 7, sidewall 103 of expansion housing 100 is provided with two ears 103a, 103b. The function of these ears 103a, 103b is to prevent over-rotation of expansion housing 100 as it is being pivoted to its operational configuration. In their fully operational configuration, fixed sidewalls 102 and 104 will respectively abut ears 103a and 103b of sidewall 103. Once expansion housing 100 is in its operational configuration, tabs 170a and 170b are inserted into slots 171a and 171b respectively, in order to lock expansion housing 100 in this position. At this point, the entire projector is in its operational configuration, ready for use.

Having thus described a preferred embodiment of the present invention, it is to be understood that the above described device is merely illustrative of the principles of the present invention, and that other devices may be devised by those skilled in the art without departing from the spirit and scope of the invention.

We claim:

1. A portable, collapsible overhead projector, comprising:
   a rigid housing;
   a light source contained within said housing;
   a post pivotally connected to said rigid housing;
   means for projecting an image on a remote area, said projecting means including optical components connected to said post so as to be displaceable with pivotable movement of said post between a storage position in which said optical components and said post are entirely within confines of said rigid housing and an operative position in which said optical components are outside of said rigid housing;
   a collapsible expansion housing hingedly connected to said rigid housing so as to be displaceable between an extended position wherein said expansion housing extends beyond said rigid housing and a collapsed position;
   a mirror; and
   means for displacing said mirror in response to displacement of said expansion housing so that in said collapsed position of said expansion housing said mirror is entirely within the confines of said rigid housing and in said extended position of said expansion housing said mirror extends between said rigid and expansion housings, said mirror being in a path of light from said light source for reflecting said light to said optical components when said expansion housing is in said extended position.

2. A projector as in claim 1, wherein said optical components include a projecting head assembly attached to said post, said projection head assembly including a frame and a projection mirror pivotally connected to said frame.

3. A projector as in claim 1, further comprising a fresnel lens, said rigid housing includes a cover closing an opening in said rigid housing, said cover holding the fresnel lens for positioning the fresnel lens within said path when said cover is in a closed position, said cover being displaceable out of said closed position for allowing access through said opening to selectively displace said optical components between said storage and operative positions.

4. A projector as in claim 3, wherein said cover is pivotally connected to said rigid housing for allowing said cover to be displaceable between said closed position and an opened position where access through said opening becomes available.

5. A projector as in claim 1, wherein said displacing means includes a hinged connection at an end of said mirror.

6. A projector as in claim 1, wherein said collapsible expansion housing has a bottom and vertical walls, said vertical walls being hingedly connected to said bottom so as to displace relative to said bottom as said expansion housing displaces between said extended and collapsed positions.

7. A projector as in claim 1, wherein said optical components include a projecting head that is pivotally attached to said rigid housing by said post.

8. A portable overhead projector as in claim 7 wherein said projecting head comprises:
   a projecting frame head;
   a projecting lens attached to said projecting head frame;
   a projection mirror pivotally attached to said projecting head frame; and
   a mounting arm, said projecting head frame being pivotally attached to said mounting arm, said mounting arm being adjustably connected to said post.

9. A portable overhead projector comprising:
   a rigid housing;
   a light source in said rigid housing;
   an optical projection system connected to said housing for projecting an image on a remote area;
   an expansion housing hingedly connected to said rigid housing for movement between a collapsed position and an extended position whereby said expansion housing extends outwardly of said rigid housing, said expansion housing and said rigid housing having a bounded interior; and
   a mirror receivable within said expansion housing when said expansion housing is in the extended position and positioned in the path of light from said light source to reflect said light to said optical system, and hinge means for hingedly connecting said mirror to said bounded interior.

10. A portable overhead projector as in claim 9 wherein said expansion housing further includes four sidewalls and a bottom wall, two of said expansion housing sidewalls being hingedly connected to said bottom wall and said rigid housing.

11. A portable overhead projector comprising:
a rigid housing having a light source compartment;
at least one light source in said light source compartment of said rigid housing;
an optical projection system connected to said housing for projecting an image on a remote area;
an expansion housing hingedly connected to said rigid housing for movement between a collapsed position expansion housing extends outwardly of said rigid housing;
a mirror receivable within said expansion housing said expansion housing is in the extended position and positioned in the path of light from said light source to reflect said light to said optical system;
a support rod connected to said light source compartment; and
a light source housing rotatably and slidably attached to said support rod, said at least one light source being retained in said light source housing within said light source compartment.

12. A portable overhead projector according to claim 11 further comprising: at least one additional light source retained in said light source housing; and a light source selection control tab attached to said light source housing.

13. A portable overhead projector comprising:
a rigid housing having a light source compartment;
at least one light source in said light source compartment of said rigid housing;
an optical projection means connected to said housing for projecting an image on a remote area;
a fold mirror;
an expansion housing means for configuring said fold mirror in a storage position within said rigid housing and for configuring said fold mirror in an operational position whereby said fold mirror becomes part of said optical projection means;
a fresnel lens;
a means for mounting said fresnel lens to said rigid housing;
a projecting head assembly attached to a post;
a means for connecting said post to said rigid housing;
a support rod connected to said light source compartment;
a light source housing;
a means for rotatably and slidably attaching said light source housing to said support rod; and
a means for retaining said at least one light source in said light source housing and within said light source compartment.

14. A portable overhead projector according to claim 13 further comprising:
at least one additional light source retained in said light source housing;
a light source selection control means for controlling a selection of said at least one or said least one additional light source for operation.

* * * * *